Nov. 3, 1953        P. J. KIRCHER        2,658,134
AUTOMATIC COFFEE MAKER
Filed Dec. 14, 1949        3 Sheets-Sheet 1

Inventor
PAUL J. KIRCHER
By
Lindsey, Prutzman & Just
Attorneys

Nov. 3, 1953           P. J. KIRCHER           2,658,134

AUTOMATIC COFFEE MAKER

Filed Dec. 14, 1949           3 Sheets-Sheet 2

Inventor
PAUL J. KIRCHER

By
Lindsey, Prutzman & Just
Attorneys

Nov. 3, 1953 P. J. KIRCHER 2,658,134
AUTOMATIC COFFEE MAKER
Filed Dec. 14, 1949 3 Sheets-Sheet 3

Inventor
PAUL J. KIRCHER

By
Lindsey, Prutzman + Just
Attorneys

Patented Nov. 3, 1953

2,658,134

UNITED STATES PATENT OFFICE 2,658,134

AUTOMATIC COFFEE MAKER

Paul J. Kircher, Plainville, Conn., assignor to Landers, Frary & Clark, New Britain, Conn., a corporation of Connecticut Application December 14, 1949, Serial No. 132,925

13 Claims. (Cl. 219—43)

The present invention relates generally to coffee makers and more particularly, to coffee makers of the electrically heated type and arranged for automatic operation.

A principal aim of the present invention is to provide a coffee maker which is fully automatic in operation and fool-proof in performance so that the operator need only introduce the required ingredients, i. e., cold water and ground coffee, into the vessels provided, set the device for the strength of brew desired, and then connect the device, it being unnecessary to give the device any further attention. Upon connection of the device, the coffee is brewed to the strength for which the device has been set whereupon the brewing of the coffee is discontinued and the coffee is thereafter maintained automatically at a desired serving temperature until used.

A further aim of the invention is to provide an automatic coffee maker which is of such design and construction that its inherent operation can be depended upon to make good coffee of uniform strength, this strength being variable to suit the user, and the device can be used over and over again with no time lapses in between, if desired, and with repeated uniform results.

A further aim is to provide an automatic coffee maker employing a heating and control system of improved and simplified construction which not only gives the improved operating characteristics mentioned, but is simple to fabricate and assemble, which is sturdy in design, economical in size and cost, and has a minimum of moving parts or other elements likely to get out of order, and a device which can be mass produced at relatively low cost from readily available and relatively inexpensive materials.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings—

Figure 1:
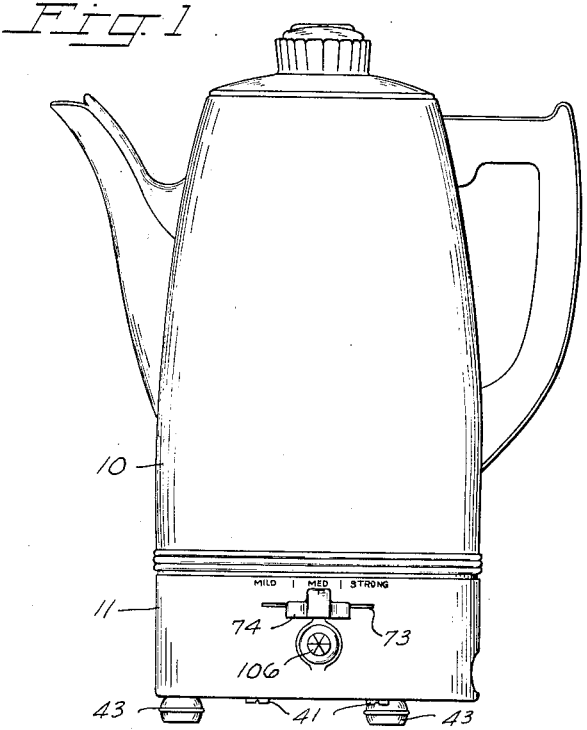
Figure 1 is a side view of one form of coffee maker embodying the present invention, this coffee maker being of the so-called percolator type.
Figure 2:
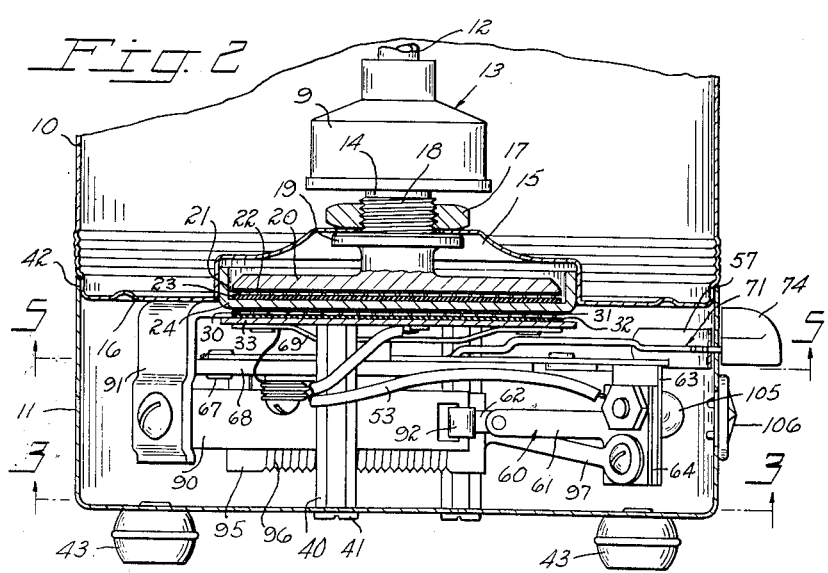
Fig. 2 is an enlarged, fragmentary view partially in cross section of the heating and control mechanism.

Referring to the drawings, the present invention is shown for illustrative purposes as embodied in a percolator type of coffee maker. The coffee maker comprises a main vessel 10 which is to contain the brew and to the bottom of which is fixed a false bottom 11 forming a compartment for housing the heating and control elements.

As mentioned above, the coffee maker illustrated in the drawings is of the percolator type which means that a quantity of water is placed in the main vessel 10 and is pumped therefrom through a fountain tube 12 to a perforated basket (not shown) at the top of the vessel, which basket contains the ground coffee. The coffee brew is formed by the hot water released from the fountain tube percolating down through the coffee, the coffee brew being permitted by the perforated basket to return to the main vessel 10.

The water in the main vessel 10 is heated in small quantities and forced upwardly through the fountain tube 12 by a percolator pump generally denoted at 13 which includes a hooded valve portion 9 resting upon a recessed hub 14, the pump being put into action by applying heat to the hub 14. The details of construction of this type of percolator pump are well known and are shown, for example, in Patent No. 1,060,263, issued April 29, 1913, to the same assignee and, accordingly, needs no further description here.

As shown in the drawings, the main vessel 10 has a struck up portion 15 forming a centrally disposed cavity in the bottom portion 16. The hub 14 previously mentioned extends through a central opening in the struck up portion 15 and is securely fastened thereto in water-tight manner by the nut 17 received on the threaded portion 18 which draws upwardly the flange 19 against the periphery of the central opening in the struck up portion 15. The hub 14 is formed of good heat conducting material such as copper or copper alloy and is provided at its lower end with a relatively thick circular plate 20 having a flat lower surface of wide area which can be utilized as a heating surface.

Heat is applied to the plate 20 electrically by a conventional heating wire or grid 21 which is disposed between mica sheets 22 and 23. The top mica sheet 22 is made much thinner than the lower mica sheet so as to insure that most of the heat generated by the heater wire or grid 21 will be transferred to the plate 20. The lower mica sheet 23 rests on a cup-shaped member 24 which also is made of good heat conducting material such as copper or copper alloy. The cup-shaped member 24 is given a press fit into the cavity or struck up portion 15 and serves to compress the heating element 21 against the mica sheet 22 and the plate 20. The design of the heating element or wire 21 is such that, when it is connected to a conventional household circuit, it will generate sufficient heat for transmission through the plate 20 to the hub 14 to cause a desired rapid rate of percolation and to start the percolation within a very brief time after the heater wire is energized, even though the vessel 10 is substantially filled with relatively cold water. In this connection, it will be noted that a very high proportion of the heat generated by the heater wire 21 is conducted upwardly into the hub 14 and very little is dissipated to the bottom 16 of the vessel 10.

Secured to the underside of the cup member 24 is a second heater wire or grid 30 which similarly is disposed between mica sheets 31 and 32 for insulating purposes. The heater wire 30 and mica sheets 31 and 32 are compressed against the cup member 24 by a metallic plate 33 riveted thereto. The path of flow of heat generated by the heater wire is upwardly through the cup member 24 to the periphery of the struck up portion 15 from which it is dissipated through the bottom 16 of the main vessel 10 to the contents of the vessels, thereby warming the contents of the vessel. The heater wire or grid 30 is designed so that, when it is connected (in series with heater wire 21 and another heater wire in this particular embodiment as explained hereinafter) across an ordinary household lighting circuit, it will generate sufficient heat which is conducted to the bottom 16 of the vessel 10 as previously mentioned to keep the contents of the vessel 10 at a desired serving temperature. In general, this amount of heat is just sufficient to overcome the heat losses of the vessel and contents through radiation, etc.

Posts 40 extending downwardly from the plate 33 are aligned with openings in the false bottom 11 so as to threadably receive connecting screws 41. This effectively connects the false bottom 11 to the main vessel 10, it being noted that these latter members have a telescoping fit 42. The false bottom 11 is provided with supporting posts or buttons 43 forming legs on which the coffee maker can rest on any convenient surface.

As mentioned above, the heating wire 21 for operating the percolator pump is adapted to be connected directly across a conventional household lighting circuit. For this purpose, one end of the heater wire 21 is connected by lead 50 to a connecting prong 51 supported on an insulating member 52. The other side of the heater wire 21 is connected by leads 53 and 55 through a normally closed switch 60 to a second prong 54 also mounted in the member 52. The prongs 51 and 54 are of conventional design and may be connected to a household electrical circuit by use of a suitable female plug as is well known in the art.

The switch 60 comprises a fixed or rigid arm 61 and a flexible arm 62 mounted on a bracket 63 and insulated therefrom and from each other by insulating blocks 64. The arms 61 and 62 are provided with suitable contact points 65 for establishing an electrical connection through the arms when the points are together, the circuit being broken by the flexing of the arm 62 away from the rigid arm 61.

The bracket 63 is adjustably mounted on the end of an arm 66 which is pivoted at 67 on a plate 68 preferably formed of non-conducting material such as a plastic material and secured to a bracket 69 by screws 59 extending through raised portions 58, the bracket 69 being fastened to the underside of plate 33 such as by riveting. The arm 66 has a cut out portion 70 in which is received one end of an actuating arm 71, this arm 71 being pivoted on the plate 68 within the confines of the cut out portion 70 and having a rounded bearing portion 72 engaging the periphery of the cut out portion 70 so as to pivot the arm 66 when the actuating arm 71 is pivoted. The amount of permissible pivoting movement of the arm 66 is limited by engagement of the arm 66 with the raised portions 56. The remaining portion of the actuating arm 71 is bent so as to clear the arm 66 and the end thereof projects through a slot 73 in the side of the false bottom 11. The end of the actuating arm 71 is provided with a suitable handle 74 to permit the operator to vary the position of the switch carrying arm 66 and there may also be provided suitable indicia adjoining the slot such as the words "Mild," "Med." and "Strong" as illustrated in the drawing, it being the function of the setting of the actuating arm 71 to determine the strength of the coffee brew as described more particularly hereinafter. The set position of the arm 71 is maintained against accidental displacement by engagement of a slidable arcuate spring member 57 against fingers 56 on the arm 71.

Figure 3:
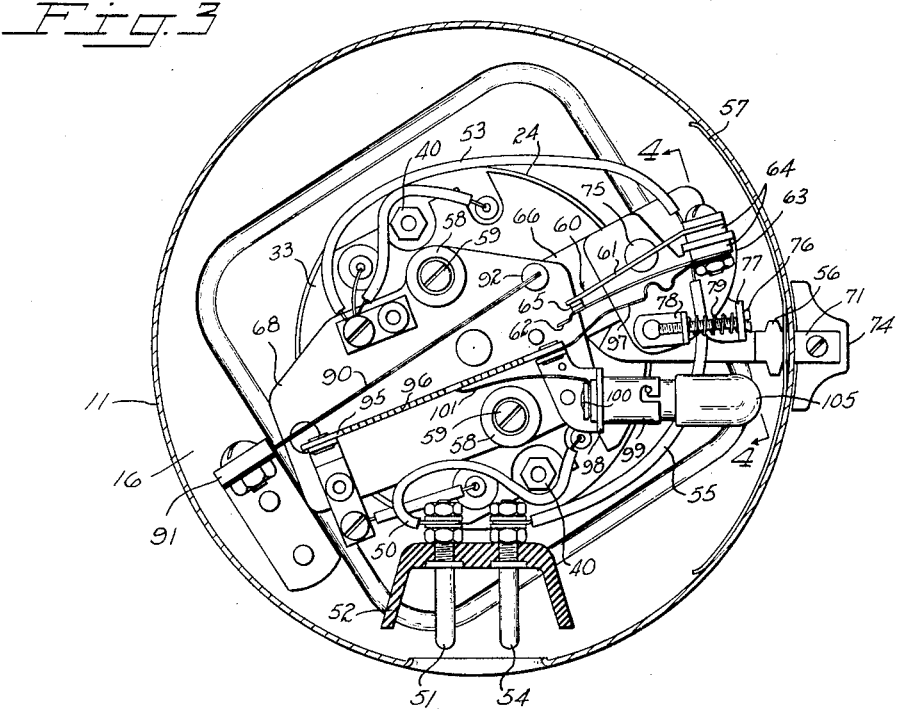
Fig. 3 is a cross sectional view taken along the line 3—3 of Fig. 2.
Figure 4:
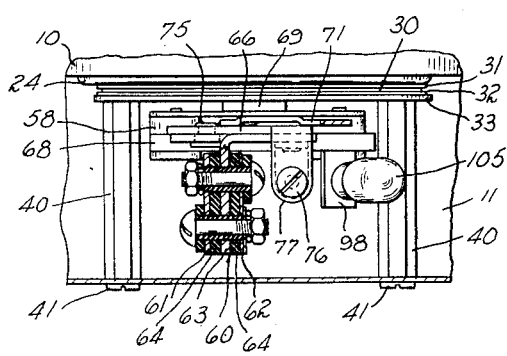
Fig. 4 is a cross sectional view taken along the line 4—4 of Fig. 3.
Figure 5:
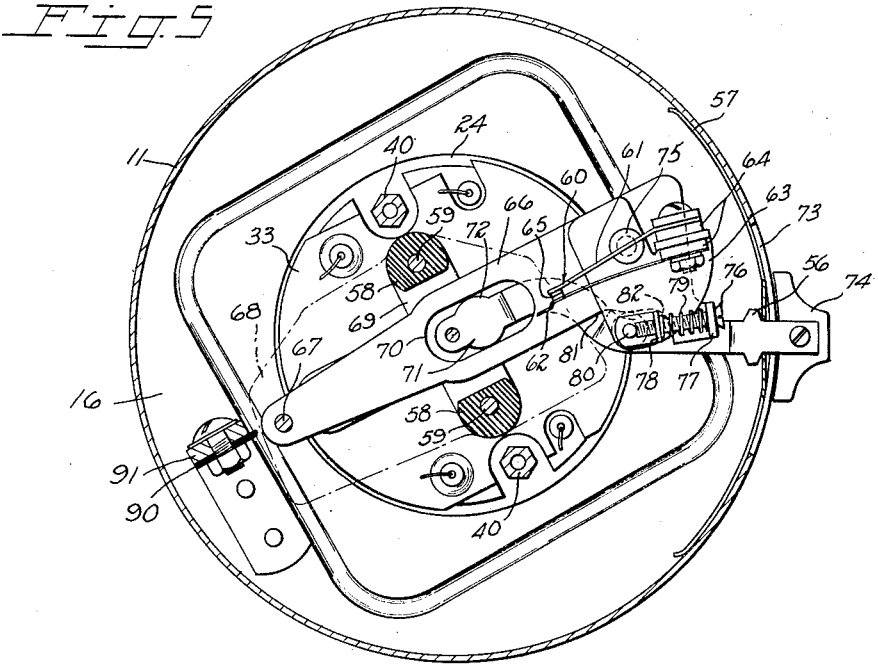
Fig. 5 is a cross sectional view taken along the line 5—5 of Fig. 2.

As mentioned above, the bracket 63 is adjustably mounted on the arm 66. This adjustable connection comprises a pivot pin 75 pivotally securing the bracket to the arm and an adjusting screw 76 extending through an opening in a bent up projection 77 on the arm 66 and threadably received by an L-shaped member 78 secured to the base of the bracket 63. A spring 79 is provided to normally urge the bracket 63 in a clockwise direction as viewed in Figs. 3 and 5. Pivoting movement of the bracket 63 is limited by a downwardly extending pin 80 on the bracket 63 which, at the extreme pivoting positions of the bracket 63, will engage on shoulders 81 and 82 cut in the arm 66. The pin 80 has a head or flanged portion engaging on the underside of the arm 66 for increasing the rigidity of the adjusted position of the bracket 63. The adjustment of the pivoted position of the bracket 63 on the arm 66 is a so-called factory adjustment, i. e., an adjustment made at the factory before the device is sold so that the setting of the switch 60 will correspond to the indicia provided adjacent the operating knob 74.

The switch 60 is adapted to be opened by the action of a bi-metallic arm 90 which is anchored at one end on a relatively heavy strap 91 of good conducting material, such as copper, which is securely engaged on the bottom portion 16 of the main vessel 10. To insure a good thermal connection, it is preferred to also make the bottom portion 16 of copper and to secure the strap 91 thereto by copper rivets and by brazing with copper alloy, resulting in a thermal path of heavy copper from the contents of the vessel to the bi-metallic arm 90. Accordingly, the temperature of the bi-metallic arm 90 is directly responsive to the temperature of the contents of the main vessel 10 and is not materially affected by any direct heating from the heating wires 21 and 30 previously mentioned. The bi-metallic arm 90 is not used as an electrical conductor in this application and for this reason, in addition, the operation of the bi-metallic arm 90 is very closely related to the temperature of the contents of the main vessel 10. The free end of the bi-metallic arm is provided with a roller bearing 92 for engaging the end of the flexible arm 62 of switch 60. When the contents of the main vessel 10 is at a relatively cold temperature, the bi-metallic arm 90 is in the position shown in Fig. 3 of the drawings. However, when the contents of the main vessel 10 is raised to a desired degree, this temperature being imparted directly to the bi-metallic arm 90 through strap 91 as aforesaid, then the arm 90 will be curved sufficiently to engage the flexible arm 62 and move it to open switch position. The temperature of the brew required to accomplish this opening of the switch 60 is, of course, predetermined by the factory setting of the bracket 63 relative to arm 66 and the adjustment of arm 66 by the positioning of the actuating arm 71.

Mounted closely adjacent the bi-metallic arm 90 is a strip of mica 95 depending from the plate 68 and on which is wound a heater wire 96. One end of this heater wire is attached by the flexible connecting member 97 to the flexible arm 62 which, in turn, is connected to the prong 54 by lead 55 as previously mentioned. Also connected to the same end of the heater wire 96 is a bracket 98 which is electrically connected to and supports a lamp socket 99. The center post 100 of the socket 99 is connected by lead 101 to an intermediate point of the heater wire 96. The opposite end of heater wire 96 is connected by lead 102 to one end of the heater wire 30, the opposite end of heater wire 30 being connected to the lead 53.

Figure 6:
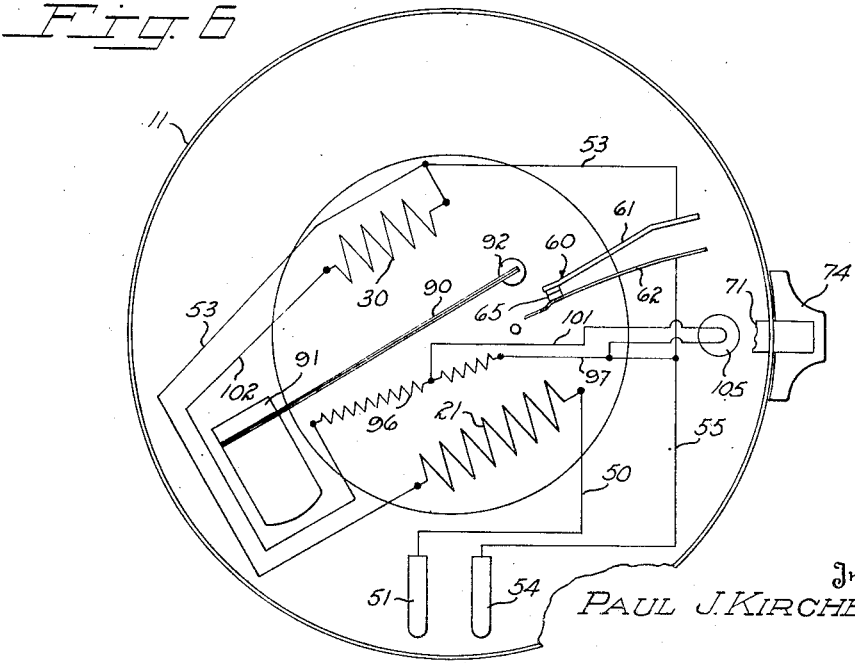
Fig. 6 is a diagrammatic view showing the electrical circuit employed.

As a result of these connections, as will be more readily apparent from Fig. 6 of the drawings, the heater wires 30 and 96 are connected in series across the prongs 51 and 54 when the switch 60 is opened and, when switch 60 is closed, the heater wires 30 and 96 are shorted out. As mentioned previously, the heater wire 30 is so designed that, when placed in series with the pump heater wire 21, it reduces the voltage across the latter to such an extent that it will not cause percolation while at the same time heater wire 30 will generate enough heat which, when transmitted to the bottom 16 of the main vessel 10, will keep the contents of the vessel at a desired serving temperature. The function of the heater wire 96 is to impart sufficient heat by radiation to the bi-metallic arm 90 so as to insure that, once the switch 60 has been opened, it will be retained in an open position by the arm 90 thereby effectively preventing the device from recycling or repercolating the contents of the vessel.

When the switch 60 is opened by the bi-metallic arm 90 thus energizing the heater wires 96 and 30, it will also energize the lamp 105 in the lamp socket 99, which lamp can be viewed from the exterior of the coffee maker through a suitable window 106. Thus, there is a visual signal when the percolating phase has ended and the coffee maker is in the warming stage.

In the operation of the automatic coffee maker, the user places a desired quantity of cold water in the vessel 10 and the desired proportionate amount of ground coffee in the basket and then plugs in the connection to the conventional household circuit. Even though the coffee maker has just been used immediately before, the addition of the cold water absorbing heat rapidly through the connecting strap 91 immediately cools down the bi-metallic arm 90 so that the switch 60 is in closed position. With the switch 60 in closed position, the heater wire 21 is connected directly across the source of power and heat is supplied to the hub 14 of the percolator pump 13. Because of the way in which the heater wire 21 is mounted in relation to the hub 14, the major portion of the heat is transmitted very rapidly to the hub 14 insuring a rapid start of the pumping action and continued pumping at a high rate. No other heating wires are energized during the percolating cycle since all of them are shorted out by the switch 60. After completion of the percolating period, which is not until all the liquid in the percolator body reaches a predetermined temperature, the bi-metallic arm 90 opens the switch 60 and thus automatically connects the heater wires 30 and 96 in series with the main heater wire 21. This immediately reduces the heat supplied to the hub 14 to a point where no further percolation occurs. The heat furnished by the heater wire 30 is transmitted to the bottom 16 of the vessel 10 directly through the cup member 24 without transmission through the hub 14. The temperature of the liquid in the container 10 required to open the switch 60 through the operation of bi-metallic arm 90 is set, of course, by the operator in manually setting the knob 74. It has been found that a very close correlation exists between the temperature of the contents of the vessel 10 and the amount of percolation which it has received. Also, because of the relatively large volume of liquid present and the manner in which the bi-metallic arm 90 is thermally connected, the arm 90 is closely responsive to brew temperature. Accordingly, the operator can very closely predetermine the strength of the brew obtained, and this strength will be uniform in repeated operations.

When the switch 60 is open, energizing the warming heater wire 30, reclosing of the switch 60 is effectively prevented by the energizing of the heater wire 96 and prevents any possibility of recycling and repercolation. The signal lamp 105, being connected across a portion of the heater wire 96, signals the completion of the brewing period and indicates that the coffee has been brewed and is being kept warm ready for serving. The circuits remain in this condition thereafter until the coffee maker is disconnected from the source of electrical power.

It thus will be seen that there has been provided in accordance with the invention a coffee maker which is fool-proof in operation, convenient to use, and which is so constructed that it is responsive accurately to the operation of the coffee maker and will transfer from a brewing to a warming cycle at exactly the point in the brewing operation desired. The device is of simple and economical construction and may be used continuously over long periods of time without failure.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In an automatic coffee maker of the percolator type, the combination comprising a vessel having a metallic base, a percolator pump including a metal hub extending upwardly through the base, an electrical heating element for said hub, a metallic generally cup-shaped member secured to the base surrounding the hub and spaced from the hub and heating element, an electrical heating element positioned at the exterior of the cup-shaped member, means for connecting the heating elements in series to a source of electrical energy, means for shorting out the last named heating element including a normally closed switch, a bi-metallic arm for opening the switch and spaced from the cup-shaped member, a heavy metallic member forming a heat conducting path between the base of the vessel and the bi-metallic arm, and means energized by opening of the switch for retaining the switch in open position.

2. In an automatic coffee maker of the percolator type, the combination comprising a vessel having a metallic base, a metal hub extending upwardly through said base axially thereof, said hub being provided with a flared base portion providing an enlarged heating surface, an electrical heating element mounted closely adjacent said heating surface, a metallic cup-shaped member surrounding said base portion and secured to the base of the vessel, the inner surface of the cup-shaped member being spaced from said base portion and the heating element, a second heating element positioned on the exterior of the cup-shaped element, means including a switch for connecting the heating elements selectively to a source of electrical power, and means for actuating the switch responsive to temperature of the contents of the vessel comprising a heavy bracket mounted on the base of the vessel and a bi-metallic arm anchored at one end on the bracket.

3. In an automatic coffee maker of the percolator type, the combination comprising a vessel having a metallic base, a percolator pump including a metal hub extending upwardly through the base, said hub being provided with a flared base portion providing an enlarged heating surface, an electrical heating element for said surface, a metallic cup-shaped member surrounding said base portion and heating element and being secured to the base of the vessel, a sheet of mica separating the heating element from the hub base and a sheet of mica separating the heating element from the cup-shaped member, the last named sheet of mica being of greater thickness than the first named sheet, a second heating element positioned on the exterior of the cup-shaped member, means for connecting the heating elements in series to a source of electrical energy, means including a normally closed switch for shorting out the second heating element, and means for opening the switch including a bi-metallic arm and a heavy metallic heat conducting member between the arm and the base of the vessel.

4. In an automatic coffee maker of the percolator type, the combination comprising a vessel having a metallic base provided with a recess formed by a centrally disposed raised portion, a percolator pump including a metal hub extending upwardly through the center of said raised portion, said hub being formed with a flared base portion extending into the recess and providing an enlarged heating surface, an electrical heating element mounted closely adjacent said heating surface, a metallic cup-shaped member extending around but spaced from the base portion of the hub and the heating element and having a press fit with the periphery of said recess, a heating element positioned on the exterior of the cup-shaped member, means for connecting the heating elements in series to a source of electrical energy, means for shorting out the last named heating element including a normally closed switch, and means for opening the switch responsive to the temperature of the contents of the vessel including a bi-metallic element and a heavy metal strap connecting the bi-metallic element to the base of the vessel.

5. In an automatic coffee maker of the percolator type, the combination comprising a vessel having a metallic base provided with a recess formed by a centrally disposed raised portion, a percolator pump including a metal hub extending upwardly through the center of said raised portion, said hub being formed with a flared base portion extending into the recess and providing an enlarged heating surface, an electrical heating element mounted closely adjacent said heating surface, a metallic cup-shaped member extending around but spaced from the base portion of the hub and the heating element and having a press fit with the periphery of said recess, a heating element positioned on the exterior of the cup-shaped member, a bi-metallic arm, means for anchoring one end of the bi-metallic arm including a heavy metallic strap secured to the base of the vessel, an electrical heating element for the bi-metallic arm, means for connecting the hub heating element to a source of electrical energy in series with the last named heating elements, and means for shorting out the last named heating elements including a normally closed switch mounted for actuation by the bi-metallic arm.

6. In an automatic coffee maker of the percolator type, the combination comprising a vessel having a metallic base provided with a recess formed by a centrally disposed raised portion, a percolator pump including a metal hub extending upwardly through the center of said raised portion, said hub being formed with a flared base portion extending into the recess and providing an enlarged heating surface, an electrical heating element mounted closely adjacent said heating surface, a metallic cup-shaped member extending around but spaced from the base portion of the hub and the heating element and having a press fit with the periphery of said recess, a heating element positioned on the exterior of the cup-shaped member, a bi-metallic arm, means for anchoring one end of the bi-metallic arm including a heavy metallic strap secured to the base of the vessel, an electrical heating element for the bi-metallic arm, means for connecting the hub heating element to a source of electrical energy in series with the last named heating elements, means for shorting out the last named heating elements including a normally closed switch mounted for actuation by the bi-metallic arm, and a signal lamp in circuit with the last named heating elements for indicating when the heating elements are energized.

7. In an automatic coffee maker of the percolator type, the combination comprising a vessel having a metallic base provided with a recess formed by a central raised portion therein, a percolator pump including a metal hub extending upwardly through the center of said raised portion, said hub being formed with a flared base portion in the recess having an enlarged heating surface, an electrical heating element mounted closely adjacent said heating surface, a metallic cup-shaped member extending around but spaced from the base portion of the hub and the heating element and having a press fit with the periphery of said recess, a heating element positioned on the exterior of the cup-shaped member, a bi-metallic arm, means for mounting the bi-metallic arm spaced from the cup-shaped member including a heavy metallic strap secured to the base of the vessel, means for connecting the heating elements in series to a source of electrical energy, means for shorting out the heating element on the exterior of the cup-shaped member including a normally closed switch, and a manually adjustable support for the switch for positioning the switch for actuation by the bi-metallic arm at a desired vessel temperature.

8. In an automatic coffee maker of the percolator type, the combination comprising a vessel having a metallic base provided with a recess formed by a central raised portion therein, a percolator pump including a metal hub extending upwardly through the center of said raised portion, said hub being formed with a flared base portion in the recess having an enlarged heating surface, an electrical heating element mounted closely adjacent said heating surface, a metallic cup-shaped member extending around but spaced from the base portion of the hub and the heating element and having a press fit with the periphery of said recess, a heating element positioned on the exterior of the cup-shaped member, a bi-metallic arm, means for mounting the bi-metallic arm spaced from the cup-shaped member including a heavy metallic strap secured to the base of the vessel, a heating element mounted closely adjacent the bi-metallic arm, means for connecting the hub heating element to a source of electrical energy in series with the heating elements for the cup-shaped member and bi-metallic arm, means for shorting out the two last named heating elements including a normally closed switch, and a manually adjustable mounting for the switch for positioning the switch for actuation by the bi-metallic arm at a desired vessel temperature.

9. In an automatic coffee maker of the percolator type, the combination comprising a vessel having a metallic base provided with a recess formed by a central raised portion therein, a percolator pump including a metal hub extending upwardly through the center of said raised portion, said hub being formed with a flared base portion in the recess having an enlarged heating surface, an electrical heating element mounted closely adjacent said heating surface, a metallic cup-shaped member extending around but spaced from the base portion of the hub and the heating element and having a press fit with the periphery of said recess, a heating element positioned on the exterior of the cup-shaped member, a bi-metallic arm, means for mounting the bi-metallic arm spaced from the cup-shaped member including a heavy metallic strap secured to the base of the vessel, a heating element mounted closely adjacent the bi-metallic arm, means for connecting the hub heating element to a source of electrical energy in series with the heating elements for the cup-shaped member and bi-metallic arm, means for shorting out the two last named heating elements including a normally closed switch, a manually adjustable mounting for the switch for positioning the switch for actuation by the bi-metallic arm at a desired vessel temperature, and signal means connected to the heating element for the bi-metallic arm to be energized therewith.

10. In an automatic coffee maker of the percolator type, the combination comprising a vessel having a metallic base, a percolator pump including a metal hub extending upwardly from the base centrally thereof, first electrical heating means mounted on the hub, second electrical heating means disposed for heating the base surrounding the hub, circuit means for connecting the heating means in series to a source of electrical energy including a switch which in closed position short-circuits the second electrical heating means, a bi-metallic arm for actuating the switch, means for mounting the arm on the base in good heat conductive relationship therewith and spaced from the heating means including a relatively massive bracket of good heat conductive material depending from the base, and a heater wire for said bi-metallic arm in juxtaposition therewith connected in said circuit so as to be energized when the switch is open.

11. In an automatic coffee maker of the percolator type, the combination comprising a vessel having a metallic base, a percolator pump including a metal hub extending upwardly from the base centrally thereof, first electrical heating means disposed for heating the hub, second electrical means disposed for heating the base surrounding the hub, circuit means including a switch for connecting the heating elements selectively to a source of electrical energy, a bi-metallic arm for actuating the switch, means for mounting the arm on the base in good heat conductive relationship therewith and spaced from the heating means including a relatively massive member of good heat conductive material secured to the base and depending therefrom, and a heater wire for said bi-metallic arm in juxtaposition therewith connected in said circuit means so as to be energized when the bi-metallic arm is heated sufficiently to actuate the switch.

12. In an automatic coffee maker of the percolator type, the combination comprising a vessel having a metallic base, a percolator pump disposed centrally of the base, first electrical heating means disposed for applying heat to the pump, second electrical heating means disposed for applying heat to the base, circuit means for connecting the heating means selectively to a source of electrical energy including a switch which in a first position provides maximum heat output of the first electrical heating means and which in a second position reduces the heat output of the first electrical heating means and increases the heat output of the second electrical heating means, a bi-metallic arm for actuating the switch, means for mounting the arm on the base in good heat conductive relationship therewith and spaced from the heating means including a relatively heavy bracket of good heat conductive material depending from the base, and a heater wire for said bi-metallic arm connected in said circuit so as to be energized when the switch is in said second position.

13. In an automatic coffee maker, the combination of a metallic vessel having a base comprising a centrally located struck-up portion surrounded by a substantially annular portion, a metallic generally cup-shaped member inserted in said cavity to form a pocket therebetween, a first heating element mounted in said pocket, a second heating element on the exterior of the cup-shaped member, a relatively heavy bracket of good heat conductive material fixed to the annular portion of the base and depending downwardly therefrom, means for forming an electrical connection of the heating elements to a source of electrical energy, means including a switch for varying the heating rates of said heating elements by varying said electrical connection, and a bi-metallic arm for actuating the switch mounted on the lower end of the bracket.

PAUL J. KIRCHER.

References Cited in the file of this patent

UNITED STATES PATENTS

| Number | Name | Date |
| --- | --- | --- |
| 955,479 | Shaler | Apr. 19, 1910 |
| 1,060,263 | Lamb | Apr. 29, 1913 |
| 1,402,417 | Hamilton | Jan. 3, 1922 |
| 1,426,411 | Rogers | Aug. 22, 1922 |
| 1,492,160 | Colby | Apr. 29, 1924 |
| 1,555,267 | Colby | Sept. 29, 1925 |
| 1,905,111 | Lamb | Apr. 25, 1933 |
| 2,025,302 | Olds | Dec. 24, 1935 |
| 2,179,936 | Keene | Nov. 14, 1939 |
| 2,212,100 | Keaton | Aug. 20, 1940 |
| 2,287,583 | Weeks | June 23, 1942 |
| 2,329,116 | Heilman | Sept. 7, 1943 |
| 2,504,728 | Purpura | Apr. 18, 1950 |

FOREIGN PATENTS

| Number | Country | Date |
| --- | --- | --- |
| 624,587 | Great Britain | June 13, 1949 |